United States Patent
Kepple et al.

[15] 3,702,084
[45] Nov. 7, 1972

[54] TRANSMISSION

[72] Inventors: Richard K. Kepple, Huron; Lubomyr O. Hewko, Port Clinton; Arden W. Rogers, Marblehead, all of Ohio

[73] Assignee: General Motors Corporation, Detroit, Mich.

[22] Filed: July 14, 1971

[21] Appl. No.: 162,592

[52] U.S. Cl. .............................................. 74/752 E
[51] Int. Cl. ........................................... F16h 5/42
[58] Field of Search .............................. 74/752 E

[56] References Cited

UNITED STATES PATENTS

| | | | |
|---|---|---|---|
| 2,022,058 | 11/1935 | Steuber | 74/752 E |
| 3,048,056 | 8/1962 | Wolfram | 74/752 E |
| 3,254,545 | 6/1966 | Witte et al | 74/752 E |
| 3,461,746 | 8/1969 | Schwerdhöfer | 74/752 E |

Primary Examiner—C. J. Husar
Attorney—Warren E. Finken et al.

[57] ABSTRACT

The illustrated two-speed accessory drive transmissions include wedge-shaped centrifugal weights and a planetary friction unit, with spring means for wedging the weights into frictional driving contact with clutching faces on the input means and/or the carrier of the planetary unit during low engine speeds for driving the output member in overdrive, and a one-way clutch for interconnecting the output and input in a direct drive relationship upon disengagement of the wedge-shaped weights from the carrier and/or input means clutching faces under the action of centrifugal force.

14 Claims, 6 Drawing Figures

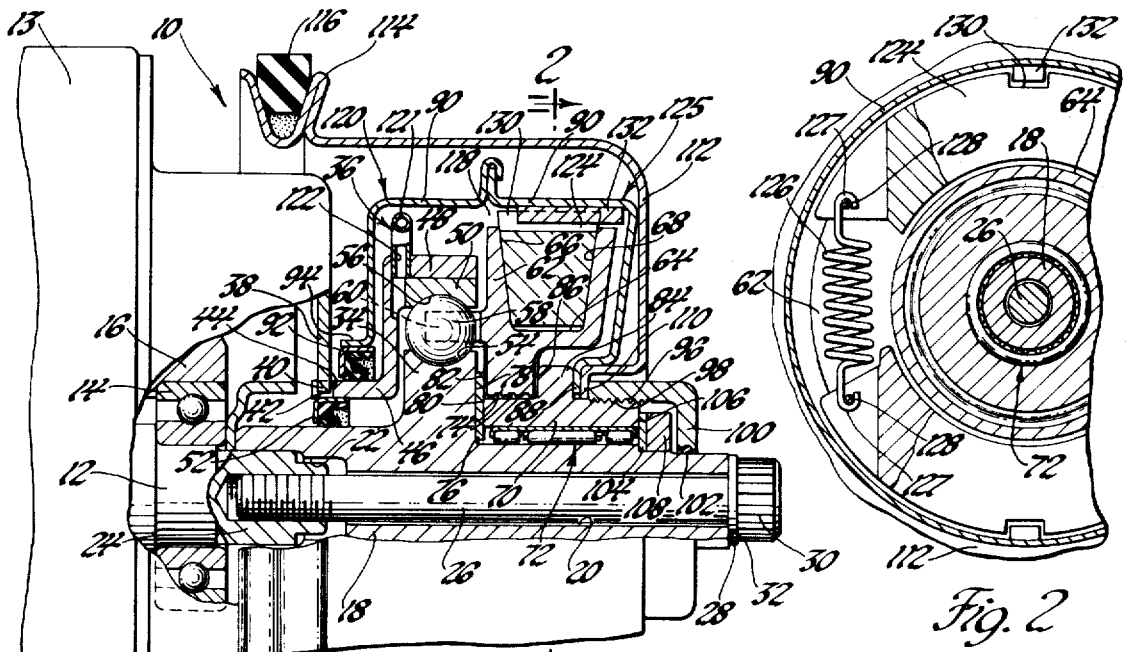
Fig. 1
Fig. 2
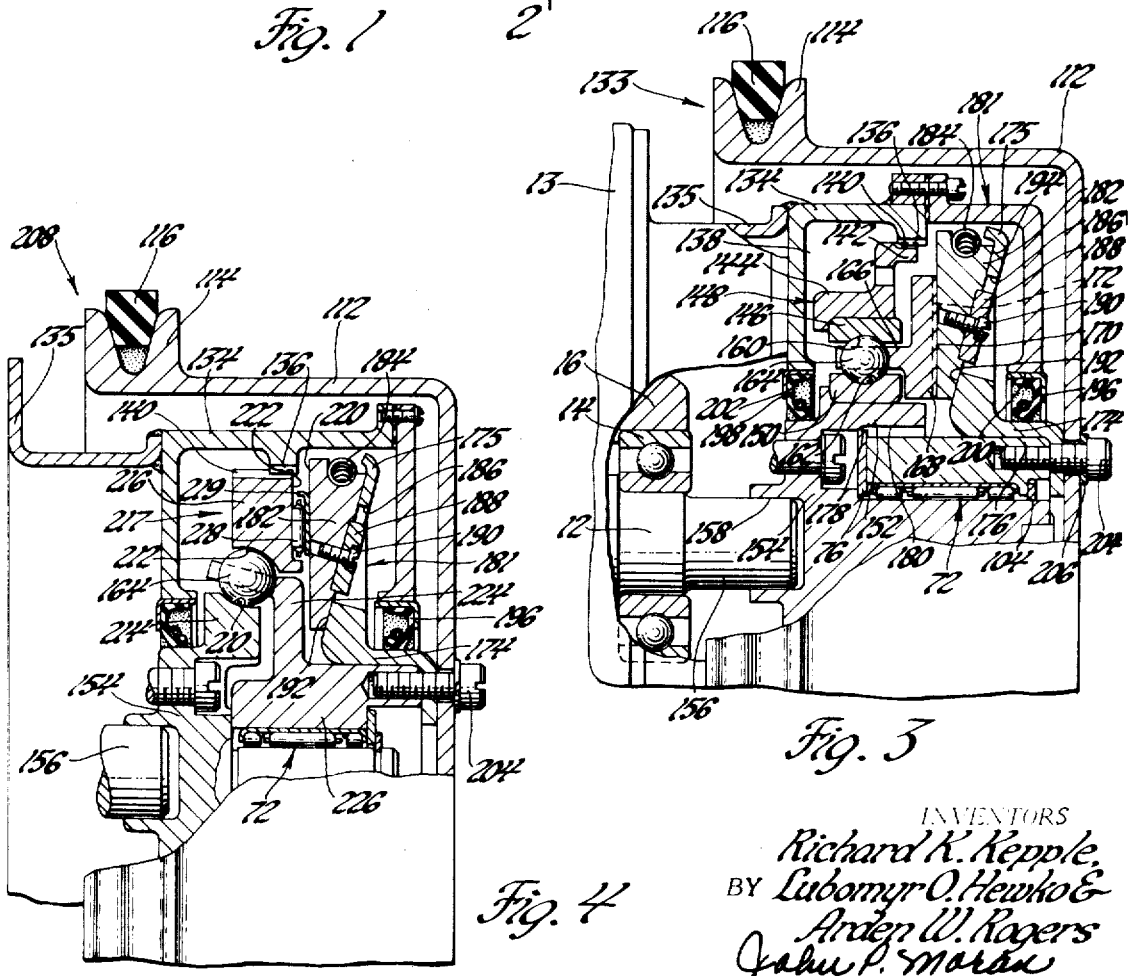
Fig. 3
Fig. 4

INVENTORS
Richard K. Kepple,
BY Lubomyr O. Hewko &
Arden W. Rogers
John P. Moran
ATTORNEY

TRANSMISSION

This invention relates generally to transmissions and, more particularly, to two-speed transmissions.

This invention provides an improved transmission for driving engine accessories at two different speed ratios with respect to the engine speed. For example, it may be desirable to increase the speed of an engine accessory, such as the air injection pump, to increase pumping capacity at low engine speeds, and then, at a predetermined higher engine speed, to drive the accessory at a 1:1 speed ratio therewith to reduce further increase in pumping capacity.

Accordingly, an object of the invention is to provide improved means for operating various engine accessories at two different speed ratios with respect to the engine speed.

Another object of the invention is to provide improved coordinated friction- and centrifugal-types of speed-changing arrangements for providing an overdrive at low engine speeds, and associated one-way clutch means for automatically reducing the speed ratio to 1:1 at predetermined higher engine speeds.

A further object of the invention is to provide an improved ball planetary friction device for controlling output speed at low engine speeds and cooperating wedge-shaped centrifugally-actuated means for efficiently rendering the ball planetary friction device ineffective at predetermined higher engine speeds.

A still further object of the invention is to incorporate a one-way clutch which becomes operative upon the disengaging action of wedge-shaped centrifugal weight members from similarly shaped clutching surfaces on the carrier and/or input means for driving a transmission output at the same speed as the input from the engine above a predetermined engine speed.

Still another object of the invention is to provide improved wedge-shaped centrifugally-actuated engaging and disengaging means for controlling the engaging and disengaging operations between the input and a ball friction planetary unit over predetermined speed ranges such that the releasing speed is higher than the engaging speed in order to eliminate hunting when the speed changes are small.

A further object of the invention is to provide a spring-loaded V- or wedge-shaped centrifugal weight means for disconnecting a ball planetary drive unit from the input and actuating a one-way clutch at a first predetermined engine speed, and reconnecting the planetary drive unit with the input at a second lower predetermined engine speed.

A still further object of the invention is to provide an improved ball and race planetary friction device and cooperating spring-loaded centrifugally-actuated clutch means for causing one of the races to serve as a fixed reaction member at low engine speeds, and additional resilient means to cause the balls and races of the planetary device to rotate as a unit at predetermined higher engine speeds.

Another object of the invention is to provide spring-loaded means for controlling a clutch plate to fix one race of a dual race and ball drive device at low engine speeds, and speed-responsive means for disengaging the clutch plate and race at higher engine speeds to permit a one-way clutch to produce direct drive between the input and output.

Yet another object of the invention is to provide a drive arrangement wherein the load across a planetary unit is variable with speed changes and may be completely unloaded at a predetermined higher input speed, the load variation occuring as a result of the axial component of the radial input force moving a slidably mounted ring or race member of a planetary unit.

Another object of the invention is to provide a drive arrangement wherein the planetary unit is preloaded a predetermined amount with the power flow to the carrier thereof interrupted by the release of a face clutch formed on the carrier in response to a predetermined higher input speed.

These and other objects and advantages of the invention will be apparent when reference is made to the following description and accompanying drawings, wherein:

FIG. 1 is a fragmentary cross-sectional view of an accessory drive mechanism embodying the invention;

FIG. 2 is an enlarged fragmentary cross-sectional view taken along the plane of line 2—2 of FIG. 1, as if FIG. 1 were a full round view, and looking in the direction of the arrows; and FIGS. 3–6 are fragmentary cross-sectional views of an accessory drive mechanism illustrating modifications of the invention.

FIG. 1 EMBODIMENT

Figure 5:
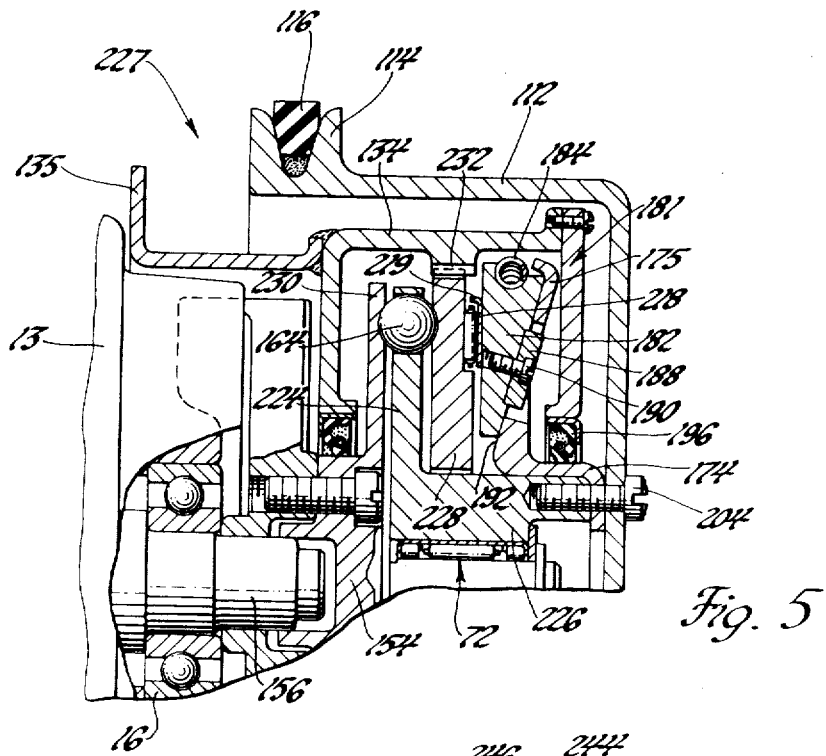

Referring now to the drawings in greater detail, FIG. 1 illustrates a two-speed accessory drive mechanism 10 including an output shaft 12 suitable for connection with a predetermined engine accessory, represented generally at 13, such as an air injection pump. The shaft 12 is rotatably mounted in bearings 14 supported in a fixed accessory housing 16. An accessory drive shaft 18 includes a central passageway 20 and a recessed end portion 22. An internally threaded end 24 of the output shaft 12 is inserted in the recess 22 and secured therein by a bolt 26 extending through the central passageway 20 and threadedly connected to the internally threaded end portion 24. A washer 28 is mounted between a head 30 of the bolt 26 and the end face 32 of the accessory drive shaft 18.

A sun member 34 of a planetary friction-drive mechanism 36 is formed integrally with the accessory drive shaft 18. A bracket 38 extends from fixed housing 16 and includes projections 40 formed around a central opening 42 thereof. The projections 40 mesh with slots 44 formed on a collar 46 to secure the collar 46. An outer ring retainer 48 extends from the collar 46 to confine an outer ring member 50 of the planetary unit 36. A suitable seal 52 is mounted between the accessory drive shaft 18 and the fixed collar 46.

Partial-spherical surfaces 54 and 56 are formed on oppositely disposed portions of the sun member 34 and the ring member 50, respectively, providing for the mounting therein of ball planet pinions 58 and the radial alignment of the members 34 and 50. The ball planet pinions 58 are mounted in the partial-spherical surfaces 54 and 56 such that the preload thereacross is a predetermined amount, depending upon the application involved. The ball planet pinions 58 are separated and driven by equally spaced fingers 60 extending axially from a carrier member 62. An annular notch or groove 64, including partial V-shaped side wall clutching surfaces 66 and 68, is formed in the carrier member 62. The carrier member 62 is rotatably mounted on a sleeve member 70 which, in turn, is rotatably mounted on a one-way clutch 72 mounted around the accessory drive shaft 18.

Lubrication grooves 74 are formed around the inner periphery of the carrier member 62 adjacent the sleeve member 70. A thrust washer 76 is mounted between the adjacent face 78 of the sun member 34 and the radially aligned end faces 80 and 82 of the sleeve member 70 and the carrier member 62, respectively. A collar 84 is formed on the sleeve member 70 and positioned intermediate a face 86 of the carrier member 62 and an internal flange 88 formed on one end of an inner housing member 90. A suitable seal 92 is mounted between a flange 94 formed on the other end of the housing member 90 and the outer surfaces of the fixed collar 46.

External threads 96 are formed adjacent the outermost end of the sleeve member 70, while cooperating internal threads 98 are formed on an end cover member 100. An O-ring seal 102 is mounted between the end cover 100 and the accessory drive shaft 18. A thrust washer 104 is mounted between the end face 106 of the sleeve member 70 and a flange 108 secured to the accessory drive shaft 18 just inside the cover member 100. The cover member 100 is threaded onto the sleeve member 70 such that an internal flange 110 of an outer housing 112 and the internal flange 88 of the inner housing 90 are confined between the cover member 100 and the collar 84 of the sleeve member 70. An input pulley 114 is formed around the outer housing 112, with a suitable belt 116 operatively connected between the pulley 114 and the engine crankshaft (not shown).

The inner housing 90 forms a chamber 118 in which the planetary friction-drive unit 36 is mounted. An oil scoop means 120, having a transversely extending opening 121 formed thereon, is mounted on the fixed outer ring retainer 48 and includes radially extending passages 122 for communicating rotating lubricating oil from the radial outer portion of the chamber 118 back to the contacting surfaces of the planetary friction-drive unit 26 during operation of the accessory drive mechanism 10.

As illustrated in FIGS. 1 and 2, a pair of oppositely disposed semicircular weights 124 are mounted in the annular groove 64 formed in the carrier member 62 along the V-shaped side walls 66 and 68 thereof to serve as a centrifugal clutch 125. The semicircular weights 124 are interconnected and urged toward one another against the tapered wall surfaces 66 and 68 by resilient means, such as a pair of coil springs 126, each being secured by end hooks 127 at both ends thereof on pins 128 formed on the adjacent ends of the weight members 124. A longitudinal slot 130 is formed in each weight member 124. A rib 132 is secured to the inner housing member 90 and extends into each slot 130.

In operation, the input from the belt 116 is through the rib and slot-type abutment 130, 132 and the two wedge-clutching faces of the weight members 124 to the carrier 62. The radially outwardly diverging opposed wedge-clutching faces of the weight members 124 cooperate with similar annular faces 68 and 68 formed on the carrier 62. The respective faces cooperate to guide the weight members 124 for radial inward and outward movement and to clutch the weight members 124 to the carrier 62 in the radial inner position and to declutch the weight members 124 therefrom in the radial outer position.

More specifically, the input pulley 114 is rotated via the belt 116 from a suitable prime mover, such as the engine crankshaft (not shown), rotating the pulley hub housing 112 and the interconnected housing 90 and sleeve member 70 therewith. At engine speeds below a predetermined value, the spring 126 urge the centrifugal weight members 124 into contact with the side walls 66 and 68 of the annular groove 64 formed in the carrier member 62. The weight members 124 are thus driven by the inner housing member 90 via the ribs 132 positioned in the longitudinal slots 130 of the weight members 124. The weight members 124 thereupon drive the carrier member 62. Inasmuch as the outer ring member 50 is fixed by the outer ring retainer 48, which is held stationary by the interconnected collar 46 and fixed bracket 38, the ball planet pinions 58 are rotated by the carrier member 62 and caused to "walk around" within the outer ring member 50. Such rotation of the ball planet pinions 58 causes the sun member 34 to rotate therewith at a predetermined increased speed with respect to the speed of the carrier member 62, depending upon the radii involved. This serves to drive the selected engine accessory 13 via the shafts 18 and 12 at the increased sun member 34 speed as compared to the input speed of the pulley 114.

Once a predetermined engine speed has been reached, the centrifugal weight members 124 will be urged radially outwardly against the force of the springs 126 and, over a predetermined speed range of, say, 50 rpm, will slippingly disengage from the sloped side walls 66 and 68 of the annular groove 64 in the carrier member 62. Once this occurs, the carrier member 62 and the sun member 34 will begin to slow down until such time as the accessory drive shaft 18, to which the sun member 34 is affixed, has attained the slower speed of the input pulley 114. At the latter speed, the output shafts 18 and 12 will be caused to continue to rotate at the input speed by the one-way clutch 72, thereby causing the selected engine accessory 13 to continue to rotate at a 1:1 speed ratio with the prime mover throughout all higher engine speeds. Due to the frictional relationship encountered during reengagement of the tapered weight members 124 with the sloped walls 66 and 68, complete reengagement thereof will occur at a lower input speed than that of the disengagement in order to eliminate hunting when the operational speed changes are over a small speed range.

FIG. 3 EMBODIMENT

Those elements of the FIG. 3 accessory drive unit 133 which are comparable to the respective elements of the FIG. 1 drive unit 10 bear the same reference numerals as those of the latter. An inner two-piece housing 134 is secured to a fixed bracket 135 of the engine accessory 13 by any suitable means, such as welding. Splines 136 are formed on the inner wall of the housing 134 in a chamber 138. Mating splines 140 are formed on a collar 142 of an outer ring retainer 144 to mesh with the fixed splines 136. An outer ring member 146 of a planetary friction-drive unit 148 is secured to the inner surface of the retainer 144. A sun member 150 is secured to an annular collar 152 formed on a central shaft 154. The shaft 154 is secured to the innermost end 156 of the output shaft 12 by any convenient means, such as by press-fitting the end 156 into a recess 158 formed in the central shaft 154.

Oppositely disposed partial-spherical surfaces 160 and 162 are formed on the outer ring member 146 and the sun member 150, respectively, providing for the mounting therein of ball planet pinions 164 and the radial alignment of the members 146 and 150. The ball planet pinions 164 are mounted intermediate the partial-spherical surfaces 160 and 162 such that the preload thereacross is a predetermined amount, depending upon the application involved. Carrier fingers 166 extend axially between the ball planet pinions 164 from a carrier 168, the fingers 166 serving to separate and drive the planet pinions 164 while the latter support the carrier 168. A radially extending clutch face 170 is formed on the carrier 168. A plurality of radially extending separator grooves 172 are formed on the clutch face 170.

A hub member 174, having a radially outwardly extending retaining collar 175, is secured to an input sleeve member 176. The sleeve member 176 is mounted around the one-way clutch 72 intermediate the thrust washers 76 and 104, the thrust washer 76 being mounted adjacent an annular wall surface 178 of a recess 180 formed intermediate the annular collar 152 and the central shaft 154.

A centrifugal clutch 181 includes a plurality of equally spaced wedge-shaped centrifugal weights 182. The weights 182 are mounted between the clutch face 170 and the retaining collar 175 and retained in contact therewith at low speeds by resilient means, such as a circular spring member 184, mounted around the outer periphery thereof. A plurality of substantially radially elongated slots 186, one adjacent each weight member 182, are formed in the retaining collar 175. A rectangular key 188 is slidably mounted in each slot 186 and secured to the adjacent centrifugal weight member 182 by a bolt 190. The surface 192 of the retaining collar 175 is tapered to correspond to the configuration of the tapered wall 194 of the adjacent centrifugal weight members 182.

Suitable seals 196 and 198 are mounted in opposite end openings 200 and 202 formed in the two-piece inner housing 134. The seal 196 mounts around the hub member 174, while the seal 198 mounts around the other annular collar member 152. The outer housing 112 on which the pulley 114 is formed is secured to the hub member 174 and the sleeve member 176 for rotation therewith by bolts 204 and accompanying washers 206.

In operation, in general, the input from the belt 116 is via a radially extending face on the weight members 182 through the adjacent radially extending clutching face 170 on the carrier 168 when the weight members 182 are in their radial inner position, the diverging opposite face 194 of the weight member 182 serving to facilitate the outward releasing movement of the weight members 182 under the action of centrifugal force to declutch the members 182 from the clutching face 170 of the carrier 168.

More specifically, in the manner similar to the operation of the FIG. 1 structure, the sleeve member 176 and the hub 174 and collar 175 are rotated by a suitable prime mover (not shown) via the pulley 114 and the belt 116, rotating the central shaft 154 therewith. Rotation of the hub member 174 and the collar 175, in turn, drives the keys 188 located in the slots 186 of the retaining collar 175, hence rotating the centrifugal weight members 182 to which the keys 188 are secured by the bolts 190. The spring 184 urges the wedge-shaped centrifugal weight members 182 radially inwardly, the degree of the slope of the tapered adjacent surface 192 of the retaining collar 175 determining the resultant axial component of the radial force on the clutch face 170 of the carrier member 168, thus producing a nonslipping engagement between the weight members 182 and the carrier member 168. It should be noted that the planetary unit 148 is initially preloaded as required across the ball planets 164. The resultant rotation of the carrier member 168 and its axially extending fingers 166 causes the ball planet pinions 164 to "walk around" within the outer ring member 146. This causes the sun member 150 to be rotated thereby at a predetermined increased speed with respect to the speed of the carrier member 168, the speed ratio depending upon the radii involved. This serves to drive the output shafts 154 and 12 and the associated selected engine accessory 13 at the increased sun member 150 speed as compared to the input speed of the pulley 114 and the carrier member 168.

Once a predetermined engine speed has been reached, the centrifugal weight members 182 will be urged radially outwardly against the force of the spring 184 and, over a predetermined speed range of, say, 50 rpm, will operatively disengage from their wedged-in positions between the clutch face 170 and the tapered wall 192 and slide outwardly along the clutch face 170. Once this occurs, the carrier member 168 and the sun member 150 will begin to slow down until such time as the associated central shaft 154 has attained the slower speed of the input sleeve member 176. At the latter speed, the central shaft 154 and the output shaft 12 will be caused to thereafter continue to rotate at the input speed by the one-way clutch 72, thereby causing the selected engine accessory 13 to rotate at a 1:1 speed ratio with the input pulley 114 throughout all higher engine speeds. The degree of taper of the respective weight and collar surfaces 194 and 192 is predetermined such that the frictional relationship therebetween causes the reengagement of these surfaces and, hence, the resumption of an increased output speed, at a lower input speed than for the disengagement therebetween described above. This eliminates hunting when the speed changes encountered during operation cover a small speed range.

FIG. 4 EMBODIMENT

The FIG. 4 accessory drive unit 208 is structurally similar to the drive unit 133 of FIG. 3, except that in the operation of the FIG. 3 arrangement, as well as the FIG. 1 arrangement, the drive is always preloaded a predetermined amount and the power flow to the carrier member is interrupted by means of a plate-type clutching arrangement, actuated by centrifugal weights, whereas in the FIG. 4 arrangement the planetary unit serves as a drive unit when loaded and as a neutral clutch when unloaded, the load on the ball members being variable. Again, comparable elements bear the same reference numerals. Otherwise, the FIG. 4 structure includes offset, oppositely disposed partial-spherical surfaces 210 and 212 formed on the sun member 214 and the outer ring member 216, respectively, of the planetary unit 217.

The sun member 214 is integral with the central shaft 154, and the outer ring member 216 connects directly to the inner housing 134 via the splines 136 and 140. Needle bearings 218 are mounted in a suitable race 219 between a vertical wall 220 of the centrifugal weight members 182 and an adjacent wall 222 of the outer ring member 216. A carrier member 224 is formed as an integral part of an input sleeve member 226 through which the outer housing 112 is driven as a result of being connected thereto by the bolt 204.

Insofar as the operation of the accessory drive unit 208 is concerned, at low engine speeds the drive from the belt 116 and its pulley housing 112 is through the hub member 174 and via the frictional grip between the weight members 182 and the clutching surface 192 of the collar 175 to the weights 182 and, thence, through the needle bearings 218 to variably load the ring member 216 for transmission of an overdrive across the ball 164 to the output sun member 214.

It may be noted that the spring 184 urges the wedge-shaped centrifugal weight members 182 radially inwardly, the degree of the slope of the tapered adjacent surface 192 of the retaining collar 175 determining the resultant axial component of the radial force on the needle bearings 218 and thence on the outer ring member 216, tending to move the outer ring member 216 to the left in FIG. 4. Such axial force component loads the planetary unit 217 across the ball planets 164 thereof, providing a locking effect thereacross, in contrast to the initially permanently preloaded planetary units 36 and 148 of FIGS. 1 and 3, respectively.

Once the input speed reaches a predetermined level, the centrifugal weight members 182 will be urged radially outwardly under the action of centrifugal force against the force of the spring 184, releasing the frictional grip between the weight members 182 and the tapered surface 192 of the retaining collar 175. This reduces the axial force component on the outer ring member 216 and permits the ball planets 164 to slip between the contoured surfaces 210 and 212, permitting the sun member 214 and the associated output shaft 154 to lose speed until a 1:1 drive ratio with the sleeve member 226 is encountered. Thereafter the one-way clutch 72 will cause the output shaft 154 to rotate at the same speed as the input sleeve member 226 until such time as the input speed drops a predetermined amount, producing reengagement of the planetary unit 148 at a lower speed than was the case for disengagement of the tapered weight members 182 from the retaining collar 175 when the speed changes frequently over a small speed range.

FIG. 5 EMBODIMENT

The FIG. 5 transmission arrangement 227 is generally similar to FIG. 4, and common elements bear the same reference numerals, except that there is a directly axial loading across the ball members 164, with input and output races 228 and 230, respectively, extending in parallel radial directions, the input race 228 being slidably secured by splines 232 to the inner housing 134 around the input sleeve member 226, and the output race 230 being formed on the central shaft 154. The needle bearings 218 are mounted intermediate the adjacent faces of the input race 228 and the centrifugal weight members 182.

Such an arrangement encompasses the variable loading effect on the ball members 164, similarly to the FIG. 4 arrangement, except that the direct axial power flow across the ball members 164, resulting from the locking effect of the axial movement of the input race 228, produces a constant 2:1 output/input speed ratio so long as the spring 184 urges the weights 182 into frictional rotational engagement with the needle bearings 218. Once the input speed reaches a predetermined level, the frictional grip between the weights 182 and the tapered surface 192 of the retaining collar 175 will be released. This reduces the axial force component on the outer ring member 216 and permits the ball planets 164 to slip between the contoured surfaces 210 and 212, permitting the sun member 214 and the associated output shaft 154 to lose speed until a 1:1 drive ratio with the sleeve member 226 is encountered. Thereafter, at all higher input speeds, the one-way clutch 72 will cause the output shaft 154 to rotate at the same speed as the input sleeve member 226.

FIG. 6 EMBODIMENT

Figure 6:
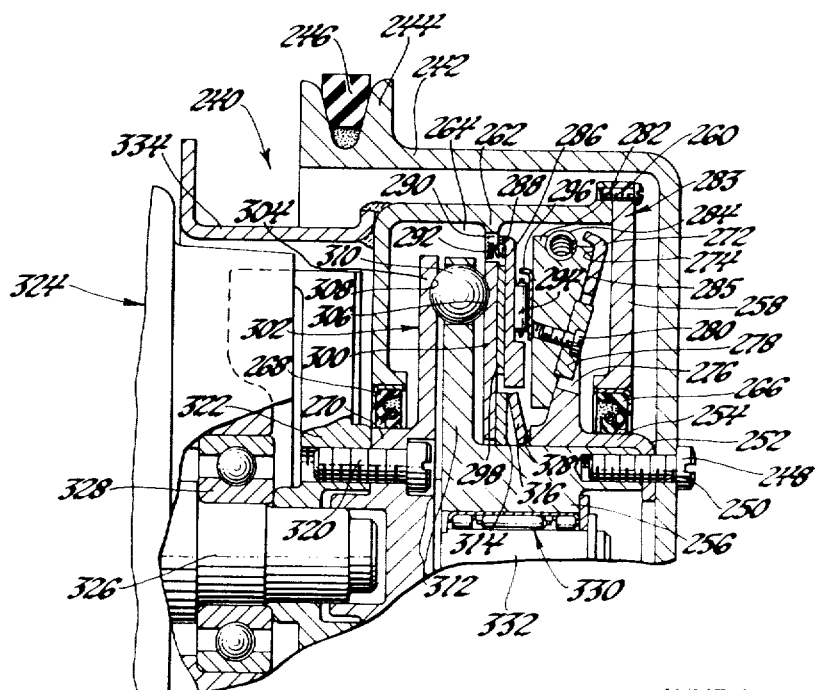

In FIG. 6 there is illustrated a two-speed accessory drive mechanism 240 similar in many respects to the FIG. 5 structure, including an outer housing 242 having a pulley 244 formed thereon. A suitable belt 246 is mounted on the pulley 244 and driven by any suitable prime mover, such as the engine crankshaft (not shown). Bolts 248 are mounted through openings 250 formed in the housing 242 to secure an internal flange 252 formed on a hub member 254 and a sleeve member 256 to the housing 242.

An inner cover member 258 is secured by bolts 260 to an inner housing body 262 forming a chamber 264. A suitable seal 266 is mounted between the hub member 254 and the cover member 258, while a second suitable seal 268 is mounted between an output shaft 270 and the inner housing body 262 at opposite ends of the chamber 264.

A retainer collar 272 is formed on the hub member 254. A surface 274 thereof is tapered at a predetermined angle with respect to a plane perpendicular to the axis of the accessory drive mechanism 240. A plurality of radial slots 276 are formed in the retainer collar 272. A key 278 is mounted in each radial slot 276 and is secured by a bolt 280 to each of a plurality of wedge-shaped centrifugal weight members 282 of a centrifugal clutch 283. Resilient means, such as a spring 284, mounted around the outer periphery of the weight members 282, urges the weight members 282 radially inwardly, toward a contacting condition between their tapered surfaces 285 and the corresponding tapered surface 274 of the retainer collar 272.

A clutch plate 286 is mounted in the chamber 264 adjacent the side of the centrifugal weight members 282 opposite the retainer collar 272. Locking tabs 288 are formed on the clutch plate 286 and mesh with splines 290 formed on an inner wall of the inner housing body 262. A plurality of springs 292, mounted on the housing body 262, urge the clutch plate 286 toward the wedge-shaped centrifugal weight members 282. A plurality of needle bearings 294 mounted in a race 296 are mounted between the clutch plate 286 and the adjacent surface of the weight members 282. A thrust washer 298 is mounted between the other face of the clutch plate 286 and a reaction race 300 of a traction-drive unit 302. An output race 304 is formed as an integral part of the output shaft 270 and is oppositely disposed from the reaction race 300. Toroidal surfaces 306 and 308 are formed on the reaction race 300 and the output race 304, respectively. A plurality of ball members 310 are mounted between the toroidal surfaces 306 and 308 in a carrier 312. The carrier 312 is formed on the sleeve member 256. A thrust washer 314 is mounted around the sleeve member 256 adjacent the reaction race 300. Suitable resilient means, such as a Belleville spring 316, is mounted between the thrust washer 314 and an end face 318 formed on the hub member 254 providing a predetermined preload across the ball members 310 between the races 300 and 304.

The output shaft 270 is secured by bolts 320 to a rotatable portion 322 of a selected engine accessory 324, the rotatable portion 322 being secured to an output shaft 326 mounted in bearings 328. A one-way clutch 330 is mounted around an extension 332 of the output shaft 270 within the sleeve member 256. The inner housing body 262 is fixed by virtue of being secured in any suitable manner, such as by welding, to a fixed bracket 334.

While the general operation of the drive mechanism 240 is similar to that of the FIG. 5 drive unit 227, more specifically, the sleeve member 256 and the hub member 254 and collar 272 are rotated by a suitable prime mover (not shown) via the pulley 244, the belt 246, and the outer housing 242, rotating the carrier member 312 therewith. Rotation of the hub member 254 and the collar 272, in turn, drives the keys 278 located in the slots 276 of the retaining collar 272, hence rotating the centrifugal weight members 282 to which the keys 278 are secured by the bolts 280. The spring 284 urges the wedge-shaped centrifugal weight members 282 radially inwardly, the degree of the slope of the tapered adjacent surface 274 of the retaining collar 272 determining the resultant axial component of the radial force on the bearings 294 and the clutch plate 286 against the reaction race 300, causing the latter to become fixed. Under this condition, rotation of the carrier member 312 by the sleeve member 256 causes the ball planets 310 to "walk around" on the now fixed reaction race 300. this causes the output race 304 to be rotated thereby at a 2:1 speed ratio with respect to the speed of the carrier member 312, due to the direct axial power flow across the ball planets 310 between the races 300 and 304. The output race 304, in turn, drives the output shaft 270, to which it is affixed, and the output shaft 326 is thus caused to drive the associated selected engine accessory 324 at twice the input speed of the pulley 244.

Once a predetermined engine speed has been reached, the centrifugal weight members 282 will be urged radially outwardly against the force of the spring 284 and, over a predetermined speed range of, say, 50 rpm, will slippingly disengage from the tapered wall 274. Once this occurs, the axial force of the clutch plate 286 on the reaction race 300 will be decreased, and the springs 292 will move the clutch plate 286 away from the reaction race 300. The output race 304 will thereupon begin to slow down until such time as the associated central output shaft 270 has attained the slower speed of the input sleeve member 256. At the latter speed, both races 300 and 304 and the carrier member 312 will rotate together due to the preload thereon from the spring 316, and the central shaft 270 and the output shaft 326 will be caused to rotate at input speed by the one-way clutch 330. This, of course, causes the selected engine accessory 324 to rotate at a 1:1 speed ratio with the input pulley 244 throughout all higher engine speeds. The degree of taper of the respective weight and collar surfaces 285 and 274 is predetermined such that the frictional relationship therebetween causes the reengagement of these surfaces and, hence, the resumption of an increased output speed, at a lower input speed than for the disengagement therebetween described above. This eliminates hunting when the speed changes encountered during operation cover a small speed range.

It should be apparent that the invention provides an improved ball planetary drive coordinated with centrifugally-actuated V- or wedge-shaped weight members which cooperate with mating outwardly diverging clutching faces formed on the carrier and/or an input member to efficiently control the engagement and disengagement of the planetary drive from the input over a predetermined speed range, permitting a one-way clutch to directly drive the output member along with the input member at all higher speeds higher than the predetermined range.

It should also be apparent that one general embodiment of the invention provides a combined planetary drive and speed-responsive arrangement wherein the planetary unit is variably loaded by centrifugal weights to serve as a drive means and may be unloaded under the action of centrifugal force to serve as a neutral clutch, while another general embodiment includes a planetary unit incorporating a constant preload thereacross with the power flow thereto being interrupted by virtue of the release of the weights from the carrier under the action of centrifugal force.

It should be further apparent that, if desired for a particular application, the elements could be rearranged such that the pulley serves as an output member with the belt driving any selected engine accessory and the output shaft serving as an input shaft, being driven by any suitable prime mover.

While several embodiments of the invention have been shown and described, other modifications thereof are possible.

We claim:
1. A transmission comprising input and output members; a traction planetary drive unit including a reaction member, a second member mounted for rotation with said output member, intermediate planet pinions frictionally contacting said reaction and second members, and a carrier member for separating and driving said planet pinions; at least one radially extending clutching surface formed on one of said carrier and input members, said surface having a predetermined degree of taper formed thereon; wedge-shaped centrifugal weight members mounted adjacent said tapered clutching surface; resilient means for urging said wedge-shaped centrifugal weight members radially inwardly into frictional engagement with said tapered clutching surface and operatively connecting said input member to said planetary drive unit at all input speeds below a predetermined value for completing the drive connection between said input and output members and overdriving said output member; and one-way clutch means mounted intermediate said input and output members, overrunning while said transmission is in overdrive, and serving to operatively connect said output member to said input member for direct drive upon radial outward releasing movement of said centrifugal weight members from said tapered clutching surface at all input speeds above a predetermined value.

2. A transmission comprising input and output members; a planetary drive unit including a first member mounted for rotation with said output member, a second member, means for securing said second member against rotation, intermediate planet pinions frictionally contacting said first and second members, and a carrier member for separating and driving said planet pinions; at least one radially outwardly tapering wedge clutching face formed on one of said input and carrier members; weight members having at least one tapered clutching face formed thereon for frictionally engaging said wedge clutching face; resilient means for urging said weight members into rotational engagement with said wedge clutching face at all input speeds below a predetermined value to effectuate rotation of said output member at a different speed with respect to the speed of said input member; and one-way clutch means operatively connected between said input and output members, said one-way clutch means serving to operatively connect said output member to said input member for rotation therewith in a direct drive relationship upon radial outward releasing movement of said tapered clutching face of said weight members from said wedge clutching face formed on said one of said input and carrier members under the action of centrifugal force at all input speeds above a predetermined value.

3. A transmission comprising input and output members; a traction planetary drive unit including a reaction member, a second member mounted for rotation with one of said input and output members, intermediate planet pinions frictionally contacting said reaction and second members, and a carrier member operatively connected to said planet pinions for rotation therewith; at least one radially extending clutching surface formed on one of said carrier, input or output members, said surface having a predetermined degree of taper formed thereon; wedge-shaped centrifugal weight members mounted adjacent said tapered clutching surface; resilient means for urging said wedge-shaped centrifugal weight members radially inwardly into frictional engagement with said tapered clutching surface and operatively connecting the other of said input and output members to said planetary drive unit at all input speeds below a predetermined value for completing the drive connection between said input and output members and overdriving said output member; and one-way clutch means mounted intermediate said input and output members, overrunning while said transmission is in overdrive, and serving to operatively connect said output member to said input member for direct drive upon radial outward releasing movement of said centrifugal weight members from said tapered clutching surface at all input speeds above a predetermined value.

4. A transmission comprising an input pulley means and an output shaft; a planetary drive unit including a sun member secured to said output shaft, an outer ring member, reaction means for securing said outer ring member against rotation, intermediate ball planet pinions frictionally contacting said sun member and said outer ring member, and a carrier for separating and driving said ball planet pinions; means for operatively connecting said carrier to said input pulley means including drive means connected to said input pulley means, at least one radially extending clutching surface formed on one of said carrier and drive means, centrifugal weight members having at least one matching clutching surface formed thereon and mounted adjacent said carrier and said drive means, and resilient means for urging said centrifugal weight members radially inwardly for rotational engagement of said clutching surface thereof with said clutching surface of one of said carrier and said drive means at all input speeds below a predetermined value to overdrive said sun member and said output shaft; and a one-way clutch rotatably mounted between said output shaft and said drive means, said one-way clutch serving to connect said drive means to said output shaft for direct drive thereof upon radial outward releasing movement of said matching clutching surfaces of said centrifugal weight members from said clutching surface of said one of said carrier and drive means in response to the action of centrifugal force at all input speeds above a predetermined value.

5. The transmission described in claim 4 wherein said planetary drive unit is preloaded a predetermined amount in order to transmit maximum output torque.

6. A transmission comprising input and output means; a planetary drive unit including a sun member formed integral with said output means, a fixed outer ring member, intermediate planet pinions frictionally contacting said sun member and said outer ring member, and a carrier member operatively connected to said planet pinions for rotation therewith; connector means between said carrier member and said input means; a groove having tapered side walls formed on the outer periphery of said carrier member; centrifugal weight members mounted in said groove; resilient means for urging said centrifugal weight members into rotational engagement with said side walls of said carrier member at all input speeds below a predetermined value to cause said sun member to be overdriven by said carrier member; and a one-way clutch operatively connected between said input and output means, said one-way clutch serving to connect said output means to said input means in a 1:1 speed ratio upon radial outward movement of said centrifugal weight members away from said tapered side walls at all input speeds above a predetermined value.

7. A transmission comprising input and output means; a planetary drive unit including a sum member mounted for rotation with said output means, a fixed outer ring member, intermediate planet pinions frictionally contacting said sun member and said outer ring member, and a carrier member operatively connected to said planet pinions for rotation therewith; a flat clutch face formed on said carrier member; a tapered clutch face formed on said input means; wedge-shaped centrifugal weight members mounted intermediate said clutch faces; resilient means for urging said centrifugal weight members radially inwardly into rotational engagement with said clutch faces at all input speeds below a predetermined value, causing said carrier member to overdrive said sun member; and a one-way clutch operatively connected between said input and output means, said one-way clutch serving to directly connect said output means to said input means for rotation therewith upon radial outward disengaging movement of said centrifugal weight members from said clutch faces at all input speeds above a predetermined value.

8. A transmission comprising input and output means; a planetary drive unit including a first race member mounted for rotation with said output means, a slidably mounted second race member, means for securing said second race member against rotation, intermediate planet pinions frictionally contacting said first and second race members, and a carrier member operatively connected to said planet pinions for rotation therewith; bearing means operatively connected to said second race member; centrifugally-actuated means for operatively interconnecting said second race member and said input means; resilient means for urging said centrifugally-actuated means into rotational engagement with said bearing means and said input means at all input speeds below a predetermined value for urging said slidably mounted second race member into frictional contact with said planet pinions to overdrive said output means; and one-way clutch means operatively connected between said input and output means, said one-way clutch means serving to operatively connect said output means to said input means for direct drive rotation therewith upon radial outward releasing movement of said centrifugally-actuated means from said bearing means and said input means at all input speeds above a predetermined value.

9. The transmission described in claim 8, wherein first and second radially extending tapered wedging surfaces are formed on said input means and on said centrifugally-actuated means, respectively, for frictionally controlling said releasing movement of said centrifugally-actuated means from said bearing means and said input means at a first predetermined speed, and for controlling the reengagement thereof at a second lower predetermined speed.

10. A transmission comprising input and output means; a planetary drive unit including a first race member mounted for rotation with said output means, a slidably mounted second race member, means for securing said second race member against rotation, intermediate ball planets frictionally contacting said first and second race members, and a carrier member operatively connected to said ball planets for rotation therewith; bearing means mounted adjacent said slidably mounted second race member; centrifugally-actuated means for operatively connecting said second race member to said input means; resilient means for urging said centrifugally-actuated means into rotational engagement with said bearing means and said input means at all input speeds below a predetermined value for urging said slidably mounted second race member into frictional contact with said ball planets for driving said first race member in overdrive; and one-way clutch means operatively connected between said input and output means, said one-way clutch means serving to connect said output means to said input means for direct drive rotation therewith upon radial outward releasing movement of said centrifugally-actuated means from said bearing means and said input means at all input speeds above a predetermined value.

11. A transmission comprising input and output means; a planetary drive unit including a sun member mounted for rotation with said output means, a fixed outer ring member, intermediate planet pinions frictionally contacting said sun member and said outer ring member, and a carrier member operatively connected to said planet pinions for rotation therewith; a tapered clutch face formed on said output means; wedge-shaped centrifugal weight members mounted intermediate said tapered clutch face and said outer ring member; bearings mounted in intermediate rotational contact with oppositely disposed faces of said centrifugal weight members and said outer ring member; resilient means for urging said centrifugal weight members radially inwardly into rotational engagement with said tapered clutch face and said bearings at all input speeds below a predetermined value, the resultant axial component of the radial force serving to frictionally engage said planet pinions with said sun and said fixed outer ring members for overdrive; and a one-way clutch operatively connected between said input and output means, said one-way clutch serving to connect said output means to said input means in a 1:1 speed ratio therewith upon radial outward releasing movement of said centrifugal weight members from said tapered clutch face at all input speeds above a predetermined value.

12. A transmission comprising input and output means; a traction-drive unit including an output race member mounted for rotation with said output means, a slidably mounted input race member, intermediate rolling members frictionally contacting said input and output race members, and a carrier member operatively connected to said intermediate rolling members and to said input means for rotation therewith; a tapered clutch face formed on said input means; wedge-shaped centrifugal weight members mounted intermediate said clutch face and said input race member; bearing means mounted intermediate said slidably mounted input race and said weight members; resilient means for urging said centrifugal weight members radially inwardly into rotational engagement with said tapered clutch face and said bearing means at all input speeds below a predetermined value, the resultant axial force component across said bearing means causing said input race member to become a fixed reaction member loading said rolling members to drive said output race member in overdrive; and a one-way clutch operatively connected between said input and output means, said one-way clutch serving to directly interconnect said output means and said input means upon radial outward disengaging movement of said centrifugal weight members from said tapered clutch face and said bearing means at all input speeds above a predetermined value.

13. A transmission comprising input and output means; a traction-drive unit including a pair of oppositely disposed race members, intermediate rotatable members frictionally contacting said pair of race members, and a carrier member operatively connected to said intermediate rotatable members for effectuating rotation thereof; connector means between said carrier member and said input means; centrifugal weight members mounted adjacent said connector means; slidably mounted clutch means intermediate said weight members and one of said race members; resilient means for urging said centrifugal weight members into rotational engagement with said connector means and rotatable on said slidably mounted clutch means for urging said clutch means into frictional contact with said one of said race members and thereby securing said one of said race members against rotation at all input speeds below a predetermined value so as to frictionally engage said rotatable members between said pair of race members to overdrive the other of said race members; and a one-way clutch operatively connected between said input and output means, said one-way clutch serving to connect said output means to said input means for direct drive rotation therewith upon radial outward releasing movement of said centrifugal weight members from said connector means and said clutch means at all input speeds above a predetermined value.

14. The transmission described in claim 13 and additional resilient means for causing said pair of race members and said carrier member to operate as a unit after said releasing movement of said centrifugal weight members.

* * * * *